(12) United States Patent
Browne et al.

(10) Patent No.: US 11,423,486 B2
(45) Date of Patent: Aug. 23, 2022

(54) METHOD FOR PRODUCTION REFACTORING OF A PRODUCING ENTITY

(75) Inventors: Hugh Browne, Bulkeley (GB); Frances Bruttin, Huningue (FR); Douglas Dean, Pfeffingen (CH); Christopher M. Kenyon, Langnau am Albis (CH); Eleni Pratsinis, Zurich (CH); Walter Van Dyck, Affligem (BE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2969 days.

(21) Appl. No.: 11/126,615

(22) Filed: May 11, 2005

(65) Prior Publication Data
US 2006/0259308 A1 Nov. 16, 2006

(51) Int. Cl.
*G06Q 40/08* (2012.01)
*G06Q 10/06* (2012.01)

(52) U.S. Cl.
CPC ......... *G06Q 40/08* (2013.01); *G06Q 10/0635* (2013.01)

(58) Field of Classification Search
CPC ............................ G06Q 40/08; G06Q 10/0635
See application file for complete search history.

(56) References Cited

U.S. PATENT DOCUMENTS

| | | | | |
|---|---|---|---|---|
| 4,582,637 A | * | 4/1986 | Kirkham | G21F 9/167 210/710 |
| 5,704,045 A | * | 12/1997 | King et al. | 705/35 |
| 6,151,582 A | * | 11/2000 | Huang | G06Q 10/06 705/7.25 |
| 6,317,700 B1 | * | 11/2001 | Bagne | 702/181 |
| 7,778,897 B1 | * | 8/2010 | Rachev et al. | 705/35 |
| 7,861,247 B1 | * | 12/2010 | Santos | G06F 9/5011 700/28 |
| 7,979,298 B2 | * | 7/2011 | Cheng et al. | 705/7.28 |
| 8,452,620 B1 | * | 5/2013 | Grundfest | G06Q 40/08 705/28 |

(Continued)

FOREIGN PATENT DOCUMENTS

| | | | | |
|---|---|---|---|---|
| CN | 1592643 A | * | 3/2005 | A61J 1/14 |
| WO | WO-0184446 A1 | * | 11/2001 | G06Q 10/06393 |
| WO | WO-2006102322 A2 | * | 9/2006 | G05B 17/02 |

OTHER PUBLICATIONS

IP.IQ.com Search. (Year: 2021).*

(Continued)

*Primary Examiner* — Tan D Nguyen
(74) *Attorney, Agent, or Firm* — Tutunjian & Bitetto, P.C.; Vazken Alexanian

(57) ABSTRACT

A method for production refactoring of a company comprises quantifying risks stemming from regulations, in particular from an introduction of new regulation. It further comprises identifying actions to take in order to reduce an exposure to risk, quantifying costs of said actions and determining a revenue at risk depending on a revenue and a probability of failure representing said risks. Furthermore, it comprises determining a sequence of actions for solving an improvement problem depending on said revenue at risk and said costs of said actions and profits reducing said revenue at risks and said costs of said actions and increasing said profits.

24 Claims, 3 Drawing Sheets

(56) References Cited

U.S. PATENT DOCUMENTS

| | | | |
|---|---|---|---|
| 2002/0023061 A1* | 2/2002 | Stewart | G06N 5/048 706/8 |
| 2002/0059093 A1* | 5/2002 | Barton et al. | 705/10 |
| 2002/0120429 A1* | 8/2002 | Ortoleva | E21B 41/0064 703/2 |
| 2003/0125997 A1* | 7/2003 | Stoltz | G06Q 40/08 705/7.28 |
| 2003/0135399 A1* | 7/2003 | Ahamparam | G06Q 10/0635 705/7.28 |
| 2003/0229525 A1* | 12/2003 | Callahan | G06Q 10/06395 705/7.28 |
| 2004/0128112 A1* | 7/2004 | Mikytuck et al. | 702/190 |
| 2004/0259179 A1* | 12/2004 | Assmann | G01N 33/6893 435/11 |
| 2005/0027645 A1* | 2/2005 | Lui et al. | 705/38 |
| 2005/0065807 A1* | 3/2005 | DeAngelis | G06Q 10/10 705/7.28 |
| 2005/0071217 A1* | 3/2005 | Hoogs | G06Q 10/0635 705/7.28 |
| 2005/0182722 A1* | 8/2005 | Meyer | G06Q 10/06 705/40 |
| 2005/0183073 A1* | 8/2005 | Reynolds | 717/141 |
| 2006/0004719 A1* | 1/2006 | Lawrence | G06Q 30/00 |
| 2006/0020357 A1* | 1/2006 | Bournas | G06Q 10/06 700/96 |
| 2006/0259308 A1* | 11/2006 | Browne | G06Q 40/08 705/7.28 |
| 2006/0287764 A1* | 12/2006 | Kraft | G06F 21/6245 700/236 |
| 2007/0011113 A1* | 1/2007 | Mosleh | G06N 7/005 706/14 |
| 2011/0125894 A1* | 5/2011 | Anderson | H04L 9/3213 709/224 |
| 2014/0164005 A1* | 6/2014 | Merkin | G06F 19/3418 705/2 |

OTHER PUBLICATIONS

GoogleScholar Search. (Year: 2021).*

Fogliazza, G. "How Information Technology . . . Automated Manufacturing Plants", 2004, Elsevier IFAC Publications, pp. 1-7. (Year: 2004).*

JH Hausmann, "Detection of conflicting functional requirements in a use case-driven approach", 2002, Proceedings of the 24 IEEEXPLORE, pp. 105-115. (Year: 2002).*

E. Mnkandla, "A Survey of Agile Methodologies", 2004, The Transactions of The SA Institute of Electrical Engineers, Dec. 2004, pp. 236-247. (Year: 2004).*

* cited by examiner

FIG 2

$$MAX \quad \sum_e \left[ \sum_p \left( Rev(p,e) \cdot \sum_{(t,s)} X(p,t,s,e) - Rev(p,e) \cdot \sum_s Effrisk(p,s,e) \right) - \sum_{(i,j)} CA(i,j,e) \cdot A(i,j,e) - \sum_{(i,hs)} CX(i,hs,e) \cdot XI(i,hs,e) \right] \quad R14$$

$$\sum_{ps} \sum_{ts} \sum_{ss} XVal(p, ps, t, ts, s, ss, e) = X(p, t, s, e) \quad \forall\ p, t, s, e \quad R2$$

$$\sum_{(t,s)} \sum_{ts} \sum_{ss} XVal(p, ps, t, ts, s, ss, e) \le XP(p, ps, e) \quad \forall\ p, ps, e \quad R3$$

$$\sum_p \sum_{ps} \sum_{ss} XVal(p, ps, t, ts, s, ss, e) \le M \cdot XT(t, ts, s, e) \quad \forall\ t, ts, s, e \quad R4$$

$$\sum_{(p,t)} \sum_{ps} \sum_{ts} XVal(p, ps, t, ts, s, ss, e) \le M \cdot XS(s, ss, e) \quad \forall\ s, ss, e \quad R5$$

$Risks(p,s,e) =$
$$\sum_t \sum_{ts} \sum_{ss} \sum_{ps} \left[ \begin{array}{l}(1 - Reltech(t, ts, s, e) \cdot Relsyst(s, ss) \cdot Relprod(p, ps)) \cdot \\ XVal(p, ps, t, ts, s, ss, e)\end{array} \right] \quad \forall\ p, s, e \quad R15$$

$Risks(p,s,e) =$
$$\sum_t \sum_{ts} \sum_{ss} \sum_{ps} [(1 - Relcomb(p, ps, t, ts, s, ss, e)) \cdot XVal(p, ps, t, ts, s, ss, e)] \quad \forall\ p, s, e \quad R16$$

$Effrisk(p, s, e) \ge Risks(pp, s, e) + \sum_t X(p, t, s, e) - 1 \quad \forall\ p, pp, s, e \quad R17$ $A(i,j,e) \to \delta[X(p,t,s,e), XI(i,hs,e)] \quad \forall\ i, hs, e \quad R8$ $\sum_{(i,j)} CA(i,j,e) \cdot A(i,j,e) \le B(e) \quad \forall\ e \quad R9$ $\sum_p \alpha(p,t,s) \cdot X(p,t,s,e) \le Cap(t,s,e) \quad \forall\ t, s, e \quad R10$ $X(p,t,s,e), XI(i,hs,e), A(i,j,e), XVal(p, ps, t, ts, s, ss, e) = 0/1 \qquad Effrisk(p,s,e), Risks(p,s,e) \ge 0 \quad R11$

B1'

B2

METHOD FOR PRODUCTION REFACTORING OF A PRODUCING ENTITY

TECHNICAL FIELD

Aspects of the invention relate to a method for production refactoring of a producing entity. Other aspects of the invention relate to a computer-based system for production refactoring of a company. Additional aspects of the invention relate to a computer program product for production refactoring of a company.

BACKGROUND OF THE INVENTION

Lower costs and increased efficiency drive in particular pharmaceutical manufacturers in the quest for continuous improvement. At the same time, the pressure of meeting regulatory compliance can sometimes seem at odds with these goals. A total cost of compliance for typical medium to large dosage form manufacturing facilities can be as high as 25% of total site operating budget. Regulatory compliance requires careful design, engineering and maintenance of pharmaceutical manufacturing operation systems.

The US food and drug administration (FDA) launched a major initiative to modernize the regulation of drug manufacturing and product quality in 2002. This was driven by the increase in the number of adverse events and drug recalls in recent years. The FDA introduced systems thinking, quality-by-design and related processes that assure the quality of any product manufacturing. This resulted in a new FDA initiative "Good Manufacturing Practices (GMP) for the $21^{st}$ Century". The initiative requires pharmaceutical companies to comprehensively manage patients' risk, base new drugs submissions and manufacturing approaches on demonstrable scientific principles, and simultaneously implement inspection-ready "GMP systems" which embed compliance and quality in their operations.

Of particular significance is the risk transfer among products resulting from the new approach of GMP systems inspections. All products produced at a facility may be considered "adulterated" if any one GMP system fails inspection. It is possible that a single low-revenue high-risk product may wipe out an entire facility's revenue. The assets and infrastructure of pharmaceutical companies were designed to meet the 25 year-old GMP regulations and are now exposed to new risks brought up by the FDA programs related to quality by design. One of the particular implications of the FDA's challenge is the restructuring of a company's supply chain.

It is therefore a challenge to provide a method for production refactoring of a company enabling the company to prosper. It is furthermore a challenge to provide a computer-based system for production refactoring of a company enabling the company to prosper. It is furthermore a challenge to provide a computer-readable medium for production refactoring of a company enabling the company to prosper. It is furthermore a challenge to provide a computer program product for production refactoring of a company enabling the company to prosper.

SUMMARY OF THE INVENTION

According to one aspect of the invention, a method for production refactoring of a company is provided, comprising quantifying risks stemming from regulations, in particular from an introduction of new regulations, identifying actions to take in order to reduce an exposure to risk, quantifying costs of the actions, determining a revenue at risk depending on a revenue and a probability of failure representing the risks and determining a sequence of actions to take solving an improvement problem depending on the revenue at risk and the costs of the actions and profit, reducing the revenue at risk and the costs of the actions and increasing the profits. In the ideal case, the improvement is an optimization, the reducing is a minimization, and the increasing is a maximization.

Regulations may be rules, e.g. provided by some authority, the authority preferably being an administrative authority like the US Food and Drug Administration (FDA). A risk represents a probability of failure due to an inspection in view of the regulations. It may incorporate compliance risk or risk due to production failure. An exemplary advantage of the method is that it enables to reduce an exposure to risk while increasing a company's secured profitability.

In a preferred embodiment of the method, it comprises that the improvement problem takes into consideration that an available budget for the actions is not exceeded. In this way it can be assured, that actions can also be in effect taken in practice.

In a further preferred embodiment of the method it comprises that the improvement problem takes into consideration that there is a constraint on the rate of change. This enables to make the determined sequence of actions also feasible in reality.

In a further preferred embodiment of the method, it comprises that the improvement problem takes into consideration that there are unacceptable actions. This enables to make the sequence of actions feasible in real practice. Unacceptable actions may, in particular, be unacceptable due to for example political reasons or physical requirements.

In a further preferred embodiment of the method it comprises quantifying the risks and identifying the actions and the costs in view of products technology and systems. This enables, in a simple way, to take into consideration the most important sources of risk.

In a further preferred embodiment of the method it comprises determining the sequence of actions to take by solving, in a computerized way, the improvement problem in a form of an improvement program of a mixed integer type. This enables to make the solving of the improvement problem feasible even for complex improvement problems in view of calculating power or resources. In addition to that existing tools may be used for solving the improvement problem, if it is in the form of the improvement program of a mixed integer type.

In a further preferred embodiment of the method it comprises quantifying at least two different hazard levels. This enables to streamline the complexity of the improvement problem and, on the other hand, the reliability of the desired results.

In a further preferred embodiment of the method it comprises quantifying the risks dependent on the hazard levels. This enables to enhance the reliability of the desired results.

In a further preferred embodiment of the method it comprises taking into consideration costs of operation in the improvement problem. This enables to further improve the sequence and choice of actions.

In a further preferred embodiment of the method it comprises identifying the costs of operation dependent on the respective hazard level. This also enables to enhance the reliability of the desired results.

In a further preferred embodiment of the method it comprises determining an effective risk dependent on a maximum of respective risks related to other products in the same system and making the improvement problem depending on the effective risk. This enables to further enhance the reliability of desired results and in this way uses the inside, that risks concerning different products may be interrelated.

In a further preferred embodiment of the method it comprises determining the sequence of actions under the constraint that there is a capacity constraint related to the technologies on the systems. This further enhances the feasibility of the proposed sequence of actions and in this way enhances the reliability of the desired results.

In a further preferred embodiment of the method it comprises determining the sequence of actions allowing risk transfer. Risk transfer may in particular be in view of transferring products and/or technologies. This enables to further improve the sequence and choice of actions.

In a further preferred embodiment of the method it comprises allowing actions to be delisting of a given product and/or remediation of a given product and/or transferring the given product to a technology and/or transferring the given product to a given system. This enables that important actions in view of products may be taken.

In a further preferred embodiment of the method it comprises allowing actions to be exiting a given technology and/or remediation of the given technology and/or transferring the given technology and/or introducing the given technology as new technology. In this way important actions in view of technology may be part of the sequence of actions determined by solving the improvement problem.

In further preferred embodiment actions are allowed to be closing down a system and/or remediation of a system and/or introduction of a new system. In this way important actions in view of the system may be part of the sequence of actions determined by solving the improvement problem.

In a further preferred embodiment of the method it comprises quantifying dependent risks being interrelated between products and/or technology and/or systems. This enables to create an even more precise improvement problem and in this way enables to find an even better sequence of actions.

In a further preferred embodiment of the method it comprises preventing actions concerning relisting after delisting of products or re-entering after exiting technologies. In this way desired sequences of actions may be achieved.

In a further preferred embodiment of the method it comprises allowing only actions to take place resulting in an improved hazard level with an improved hazard level being considered as being a hazard level with less hazard. This also results in decreasing the complexity of the improvement problem.

In a further preferred embodiment of the method it comprises allowing each one product to be produced in each one system only. This reduces the complexity of the improvement problem while at the same time leaving room for creating more than one respective product, if necessary.

In a further preferred embodiment of the method it comprises allowing one product to be allocated to one technology only. This also reduces the complexity of the improvement problem and, at the same leaves room for creating more than one respective technology, if necessary.

In a further preferred embodiment of the method it comprises restricting a change in a hazard level related to a specific technology only in conjunction with all products using the specific technology in one specific system or in all specific systems. This uses the insight, that a change in hazard level has an effect on all products using the specific technology and in this way enables to enhance the reliability of the desired results.

In a further preferred embodiment of the method it comprises applying the method for production refactoring of pharmaceutical companies.

In a further preferred embodiment of the method it comprises deploying the method for production refactoring at a customer's company.

According to a second aspect of the invention, a computer-based system for production refactoring of a company is provided the system being designed for receiving quantified risks stemming from regulations, in particular from an introduction of new regulations, receiving identified actions to take in order to reduce an exposure to risk, and receiving quantified costs of the actions. The system is further designed for determining a revenue at risk depending on a revenue and a probability of failure representing the risks and for determining a sequence of actions to take solving an improvement problem depending on the revenue at risk and the costs of the actions and profits reducing the costs of the actions and decreasing the profits.

The method for production refactoring of a company and its preferred embodiments correspond to the computer-based system for production refactoring of companies. Also the respective advantages correspond to each other.

According to a third aspect of the invention, a computer program product for production refactoring of a company is provided the computer program product being designed for receiving quantified risks stemming from regulations, in particular from an introduction of new regulations, receiving identified actions to take in order to reduce an exposure to risk, and receiving quantified costs of the actions. The system is further designed for determining a revenue at risk depending on a revenue and a probability of failure representing the risks and for determining a sequence of actions to take automatically solving an improvement problem depending on the revenue at risk and the costs of the actions and profits reducing the costs of the actions and increasing the profits.

The method for production refactoring of a company and its preferred embodiments correspond to the computer program product for production refactoring of companies. Also the respective advantages correspond to each other.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings, wherein:

FIG. 2 shows a block diagram schematic of production refactoring of a company.

DESCRIPTION OF PREFERRED EMBODIMENTS OF THE INVENTION

Figure 1:
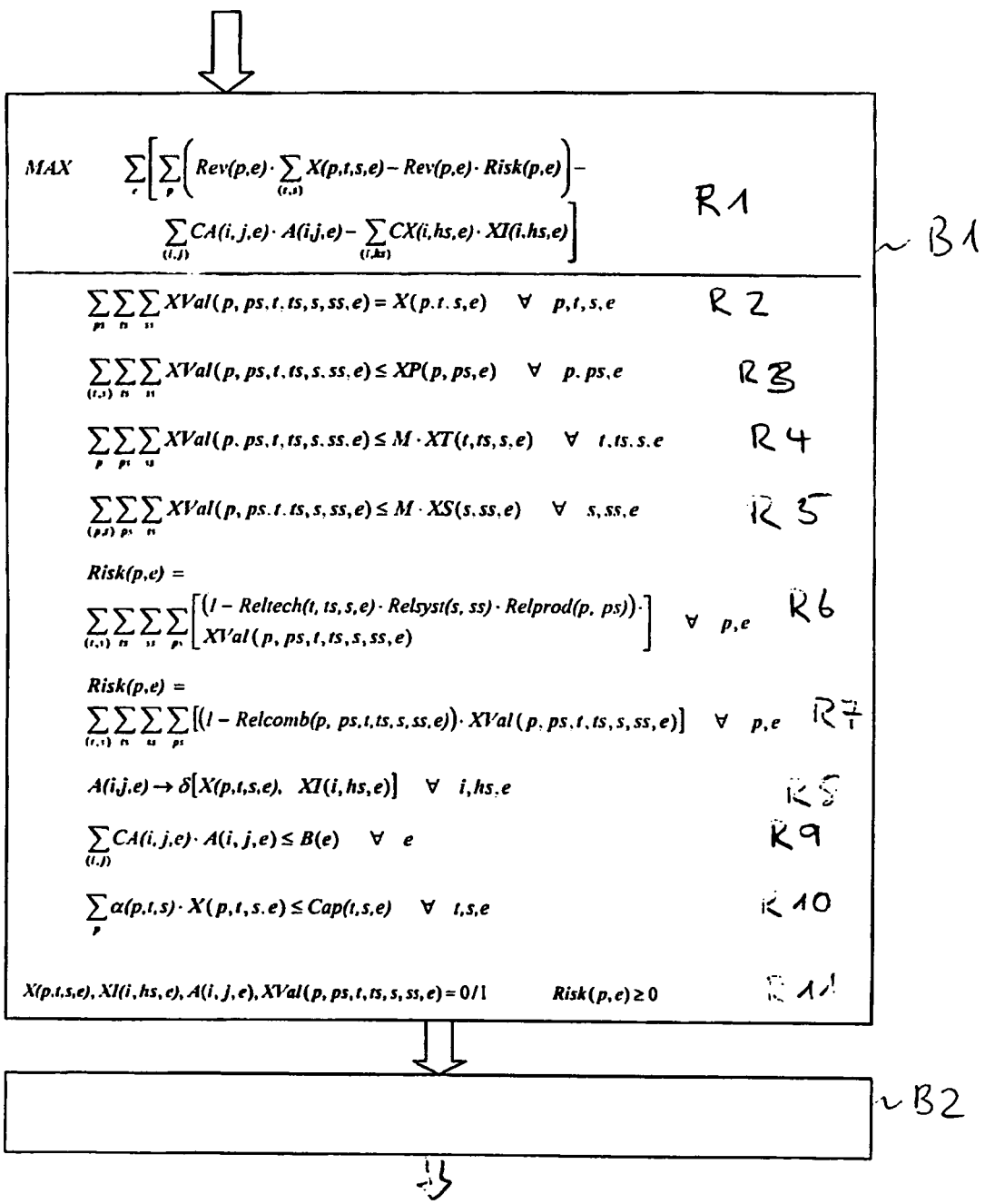
FIG. 1 shows a high level schematic in a block diagram for production refactoring of a company.

FIG. 1 shows a first block diagram for production refactoring of a company. A block B1 comprises an improvement program of mixed integer type. It comprises an objective function to be maximized represented by R1 and linear constraints R2 to R10. It further comprises starting conditions and balance constraints R11.

A block B2 is designed for solving the mixed integer program by optimizing the objective function R1 taking into consideration the constraints R2 to R10 and the starting conditions R11. For solving the improvement problem, block B2 may comprise a modeling package such as GAMS which may use CPLEX for solving it. GAMS and CPLEX are commercially available tools. The output of block B2 is then a sequence of actions to take in order to refactor the production of a company.

The model of block B1 is explained in the following. Basis for the model is that companies face risks stemming from regulations, in particular from an introduction of regulations. Such regulations may in the case of the pharmaceutical industry in the United States, for example, be the new Food & Drug Administration (FDA) initiative, "Good Manufacturing Practices for the $21^{st}$ Century". This initiative requires pharmaceutical companies to comprehensively manage patient risk, base new drugs submissions and manufacturing approaches on demonstrable scientific principles, and simultaneously implement inspection-ready GMP systems to embed compliance and quality into their operations. Sources of risk due to regulations are identified and the risks are quantified to give probabilities between 0 and 1, called hazard indices. A number of actions are identified that one can take in order to reduce an exposure to risk.

During a given planning horizon, a sequence of actions to take is determined in order to reduce an exposure to risk and increase profits. For measuring the exposure to risk, a performance measure, revenue at risk is given, which is equal to a revenue times to probability of failure. The revenue at risk is therefore an amount of money one expects to lose if a product gets inspected and fails inspection. For each action to be taken, the cost for the respective action is derived or estimated. In addition to that, the respective actions have a given, either known or measurable, effect on hazard indices.

An available budget may be selected to not be allowed to be exceeded. The budget may be given over a whole planning horizon or per time period e or per set of actions. In addition to that, a constraint can be given on a rate of change. In addition to that, unacceptable actions for specific products or other elements may be forbidden, for example for political reasons or due to physical requirements.

An index i is chosen to be the index for sources of risk. i ∈I: i=i1, i2, i3, . . . .

Preferably, these sources of risk are characteristics of the production of a respective product p and together they may describe the production process of the respective product p. In a preferred embodiment, in particular suitable for the pharmaceutical industry, three sources of risks are given by p being the respective product, t being a respective technology, and s being a system. In that way, t and s describe the production process of a product p.

A system may be equal to one site, in particular a production site. One site may however also comprise more than one system.

An index hs indicates a hazard level of an element, in case the sources of risks are the products p, the technology t and the system s, then the respective hazard levels may be ps, ts and ss. The values of the hazard levels may take two values, such as an actual and a target hazard level or more than two to also include intermediate hazard levels.

An index e denotes for the respective time period.

In the following the formulation of the improvement problem is described.

Sets are represented by:
i={p,t,s} also pp is used for p,
hs={1, 2, . . . }=all hazard levels, related to products the hazard level is represented by ps, related to technologies the hazard level is represented by ts and related to systems the hazard level is represented by ss,
j={1, 2, . . . }=actions,
e=periods The following parameters are given data. They are acquired by quantifying or respectively identifying them. This may e.g. be achieved by measuring them or estimating them. The parameters are as follows:
Rev(p,e)=revenue value for product p in time period e,
Rel(i, hs, e)=the reliability value of element i in hazard level hs in period e
When i=p, then Rel(i, hs, e)≡Relprod(p, ps) (same for all periods)
When i=(t,s), then Rel(i, hs, e)≡Reltech(t, ts, s, e)
When i=s, then Rel(i, hs, e)≡Relsyst(s, ss) (same for all periods)
CX(i, hs, e)=cost for operating element i at hazard level hs in period e
CA(i,j,e)=the cost associated with a respective action
α(p,t,s)=number of time units—or other if appropriate—used by technology t on system s for the production of product p
Cap(t,s,e)=available capacity in time units—or whatever is appropriate—of technology t on system s in period e.

In addition to this decision variables are provided. Their values may be automatically modified while determining the sequence of actions to take in Block B2. The decision variables are:
X(p,t,s,e)=1 if product p is produced by technology t on system s
XI(i, hs, e)=1 if element i is at hazard level hs in period e; where i=p, t, s
When i=p, then XI(i, hs, e)≡XP(p, ps, e)
When i=(t,s), then XI(i, hs, e)≡XT(t, ts, s, e)
When i=s, then XI(i, hs, e)≡XS(s, ss, e)
X(p,t,s,e)=1 if product p is produced by technology t on system s in period e,
XP(p,ps,e)=1 if the inherent hazard of product p is at state ps in period e,
XT(t,ts,s,e)=1 if the inherent hazard of technology platform t on system s is at state ts in period e,
XS(s,ss,e)=1 if the inherent system hazard of system s is at state ss in period e,
A(i,j,e)=1 if action j is applied on element i in period e Index j indicates the action. In the following the preferred actions are explained. Action 1 (1=1) may be delisting or exiting. It is delisting if it refers to product p—that is when the index i=p; exiting for technology t on system s when i=(t,s); closing down a site/system when i=s. Action 2 (j=2) may be remediation which can be applied to any of the 3 elements p,t,s. Action 3 (j=3) may be for transferring product to a technology and it only applies for i=p. Action 4 (j=4) is for transferring product to a system and it only applies for i=p. Action 5 (j=5) is for introducing either new technology or new site and it applies for i=(t,s),s.

Actions have an impact on other decision variables. This is represented by the following relation:

$$A(i,j,e) \rightarrow [X(p,t,s,e), XI(i,hs,e)] \forall i, hs, e$$

Further decision variables are:
Risks(p,s,e)=the hazard of product p on system s in time period e,
Risk(p,e)=the hazard of product p in period e,
Effrisk(p,s,e)=effective-maximum-hazard of product p on system s in time period e and
XVal(p,ps,t,ts,s,ss,e)=1 if product p is produced with technology t on system s in time period e, and the inherent hazard of product p is at state ps, the inherent technology hazard in that system is at hazard level ts, while the inherent system hazard is at state ss. It is 0 otherwise.

This may also be represented by the following relation:

$$XVal(p,ps,t,ts,s,ss,e)=1 \text{ if } X(p,t,s,e)=XT(t,ts,s,e)=XS(s,ss,e)=XP(p,ps,e)=1$$

The cost of actions should be within the available budget. This is represented by the following relation, which is also part of block B1 as relation R9:

$$\sum_{(i,j)} CA(i,j,e) \cdot A(i,j,e) \leq B(e) \forall e$$

B(e) represents the budget for the time period e, which is also a given input for block B1.

In addition to that preferably a capacity constraint is part of the improvement problem. α(p,t,s) represents a number of time units (or other if appropriate) used by technology t on system s for the production of product p A total amount of available capacity Cap(t,s,e) is a capacity in time units—or whatever is appropriate—of technology t on system s in time period e.

This results in a capacity feasibility constraint, which is also part of block B1 as relation R10:

$$\sum_{p} \alpha(p,t,s) \cdot X(p,t,s,e) \leq Cap(t,s,e) \forall t, s, e$$

The risk of a product in any period depends on the product p, the technology t, and the system s used for production and the corresponding hazard levels. The formulation of the improvement problem handles both the situation when the hazards indices of the elements—the product p, the technology t, and the system s—are independent, and the situation of dependent hazard indices.

In the case of independent risk elements, the probability of failure is given by the probability that any one of the elements fails. This is equivalent to 1−probability that no element fails and is given by the equation below:

$$Risk(p,e) = \sum_{(t,s)} X(p,t,s,e) \cdot \left\{ 1 - \prod_{i} \left[ \sum_{hs} (Rel(i,hs,e) \cdot XI(i,hs,e)) \right] \right\} \forall p, e$$

and in particular by:

$$Risk(p,e) = \sum_{(t,s)} X(p,t,s,e) \cdot \left\{ 1 - \sum_{ts} [Reltech(t,ts,s,e) \cdot XT(t,ts,s,e)] \cdot \sum_{ss} [Relsyst(s,ss) \cdot XS(s,ss,e)] \cdot \sum_{ps} [Relprod(p,ps) \cdot XP(p,ps,e)] \right\}$$

In the case of dependent risk elements, the probability available is for the triple (p,t,s). In other words, instead of having an individual Relprod, Reltech and Relsyst, there will one combined value as: Relcomb(i1,hs1,i2,hs2,i3,hs3, . . . ,e)=reliability value when element i1 is in hazard level hs1, element i2 is in hazard level hs2, element i3 is in hazard level hs3, and so on, in time period e.

For the particular case of elements being the product p, the technology t, and the system s this is equivalent to: Relcomb(p, ps, t, ts, s, ss, e).

A risk equation is then given by:

$$Risk(p,e) = \sum_{(t,s)} X(p,t,s,e) \cdot \left\{ 1 - \sum_{hs1} \sum_{hs2} \cdots \left[ Relcomb(i1,hs1,i2,hs2,\ldots,e) \cdot \prod_{i} XI(i,hs,e) \right] \right\}$$

$$\forall p, e$$

or for the particular case of elements being the product p, the technology t, and the system s:

$$Risk(p,e) = \sum_{(t,s)} X(p,t,s,e) \cdot \left\{ 1 - \sum_{ps} \sum_{ts} \sum_{ss} \begin{bmatrix} Relcomb(p,ps,t,ts,s,ss,e) \cdot \\ XP(p,ps,e) \cdot \\ XT(t,ts,s,e) \cdot \\ XS(s,ss,e) \end{bmatrix} \right\}$$

$$\forall p, e$$

In either case—dependent or independent risk elements—the equation of the risk is nonlinear. To linearize the risk equation a variable XVal is defined with
XVal(p,ps,t,ts,s,ss,e)=1, if product p is produced with technology t on system s in time period e, and the inherent hazard of product p is at hazard level ps, the inherent technology hazard at that site is at hazard level ts, while the inherent system hazard is at hazard level ss. It is 0 otherwise.

This may be expressed by
XVal(p,ps,t,ts,s,ss,e)=1  if  X(p,t,s,e)=XT(t,ts,s,e)=XS(s,ss,e)=XP(p,ps,e)=1

The following set of linear constraints defines the relationship:

$$\sum_{ps} \sum_{ts} \sum_{ss} XVal(p,ps,t,ts,s,ss,e) = X(p,t,s,e) \forall p, t, s, e$$

$$\sum_{(t,s)} \sum_{ts} \sum_{ss} XVal(p,ps,t,ts,s,ss,e) \leq XP(p,ps,e) \forall p, ps, e$$

-continued $$\sum_p \sum_{ps} \sum_{ss} XVal(p, ps, t, ts, s, ss, e) \le M \cdot XT(t, ts, s, e) \forall\, t, ts, s, e$$

$$\sum_{(p,t)} \sum_{ps} \sum_{ts} XVal(p, ps, t, ts, s, ss, e) \le M \cdot XS(s, ss, e) \forall\, s, ss, e$$

where M is typically a large number. M represents a value that is high enough that it does not or only negligibly restrict the value of a decision variable or render a constraint infeasible. In theory one may use a very large number such as 1,000,000. However, such a large value will cause the computational time to increase. So it is prefered to select a value that is high enough so that it is not restrictive, but small enough not to an undesiredly long computation time. For the equations in the formulation, the sum of the left hand side will be at most as high as the total number of products p considered in the formulation, so that M on the right hand side is prefered to have at least that value. The total number of products p is equal to the total number of possible values index p can have, i.e. if p=p1, p2, . . . , p100 them one considers 100 products and M may be equal to 100.

The above relations are also represented in block B1 by relations R2 to R5.

For the case of independent risk sources the risk equation becomes:

$$Risk(p, e) = \sum_{(t,s)} \sum_{ts} \sum_{ss} \sum_{ps}$$
$$[(1 - Reltech(t, ts, s, e) \cdot Relsyst(s, ss) \cdot Relprod(p, ps)) \cdot XVal(p, ps, t, ts, s, ss, e)] \forall\, p, e$$

This is also represented in block B1 by relation R6.

For the case of dependent risk sources the risk equation becomes:

$$Risk(p, e) = \sum_{(t,s)} \sum_{ts} \sum_{ss} \sum_{ps}$$
$$\begin{bmatrix} (1 - Relcomb(p, ps, t, ts, s, ss, e)) \cdot \\ XVal(p, ps, t, ts, s, ss, e) \end{bmatrix} \forall\, p, e$$

This is also represented in block B1 by relation R7.

An objective function is then given by:

$$MAX \sum_e \left[ \sum_p \left( Rev(p, e) \cdot \sum_{(t,s)} X(p, t, s, e) - Rev(p, e) \cdot Risk(p, e) \right) - \sum_{(i,j)} CA(i, j, e) \cdot A(i, j, e) - \sum_{(i,hs)} CX(i, hs, e) \cdot XI(i, hs, e) \right]$$

This is also represented in block B1 by relation R1.

The relations R1 to R11 then form the mixed integer program, which is then the input to block B2, which is designed for automatically determining the sequence of actions to take solving the improvement problem.

R11 represents starting conditions and in that way represents a configuration of the company at time 0. i.e. at time 0, for each product, it is the technology t and the system s it uses, for each site it is the technologies t that it has.

In a further embodiment according to FIG. 2 a risk transfer among products p using the same system s is allowed, which enables to obtain the optimal sequence of actions under situations with risk transfer.

In the case of risk transfer among products using the same system, the effective hazard level of a product is equal to the hazard level of the product with the highest overall value on that system s.

It is useful to obtain the risk value for each product p in a period e but also on a system s. For the case of independent risk elements, this can be obtained by:

$$Risks(p, s, e) = \sum_t \sum_{ts} \sum_{ss} \sum_{ps} \left[ \begin{array}{c} (1 - Reltech(t, ts, s, e) \cdot Relsyst(s, ss) \cdot \\ Relprod(p, ps)) \cdot Relval(p, ps, t, ts, s, ss, e) \end{array} \right] \forall\, p, s, e$$

This is represented in block B1' by relation R15.

Similarly, for the case of dependent risk elements:

$$Risks(p, s, e) = \sum_t \sum_{ts} \sum_{ss} \sum_{ps} \left[ \begin{array}{c} (1 - Relcomb(p, ps, t, ts, s, ss, e)) \cdot \\ XVal(p, ps, t, ts, s, ss, e) \end{array} \right] \forall\, p, s, e$$

This is represented in block B1' by relation R16.

Then, the effective risk is given by:

$$Effrisk(p, s, e) = \underset{pp}{MAX}\left[ Risks(pp, s, e) \cdot \sum_t X(p, t, s, e) \right] \forall\, p, pp, s, e$$

This equation can be written as a linear equation:

$$Effrisk(p, s, e) \ge Risks(pp, s, e) + \sum_t X(p, t, s, e) - 1 \; \forall\, p, pp, s, e$$

where pp is an index for product, just like p. In other words, the risk for product p is found by examining all products (pp) on that system s. This is represented in block B1' by relation R17.

Allowing risk transfer between products p using the same system s and the objective function is:

$$MAX \sum_e \left[ \sum_p \left( Rev(p, e) \cdot \sum_{(t,s)} X(p, t, s, e) - Rev(p, e) \cdot \sum_s Effrisks(p, s, e) \right) - \sum_{(i,j)} CA(i, j, e) \cdot A(i, j, e) - \sum_{(i,hs)} CX(i, hs, e) \cdot XI(i, hs, e) \right]$$

This is represented in block B1' by relation R14.

The relations R2 to R5, R8 to R11, R14 to R17 then form the mixed integer program, which is then the input to block B2, which is designed for automatically determining the sequence of actions to take solving the improvement problem.

A further constraint that is preferably integrated when solving the improvement problem in block B2 is a physical constraint on the rate of change.

A further constraint that is preferably used when solving the improvement problem in block B2 is are unacceptable actions. Unacceptable actions may, in particular, be unacceptable due to for example political reasons or physical requirements.

A further constraint for solving the improvement problem in block B2 can be preventing actions concerning relisting after delisting of products p or re-entering after exiting technologies t. A further constraint for solving the improvement problem in block B2 can be allowing only actions to take place resulting in an improved hazard level with an improved hazard level being considered as being a hazard level with less hazard. This also results in decreasing the complexity of the improvement problem. A further constraint for solving the improvement problem in block B2 can be restricting a change in the hazard level related to a specific technology t only in conjunction with all products p using the specific technology t in one specific system s or in all specific systems s. Each one product p should preferably only be allowed to be produced in each one system s only. Each one product p should preferably only be allowed to be allocated to one technology t only.

Figure 3:
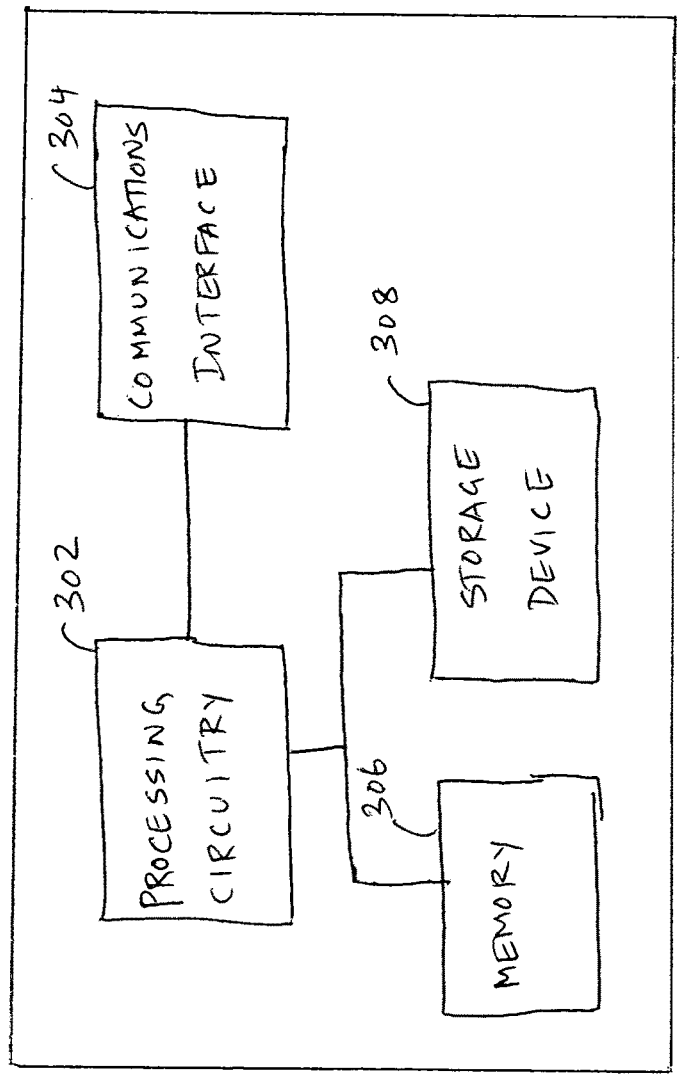
FIG. 3 is a computer system configured to execute programming of the production refactoring identified in FIGS. 1-2.

FIG. 3 is a block diagram schematic of a computer system 300 configured to implement production refactoring of a producing entity (e.g., company). The computer system 300 includes a processing circuitry 302, a communications interface 304, a memory 306, and a storage device 308.

The invention claimed is:

1. A method for production refactoring of a producing entity, comprising:
   receiving new regulations for which regulatory compliance is required, wherein refactoring of the producing entity is required in order to achieve said regulatory compliance with said new regulations, wherein refactoring comprises restructuring of the producing entity's supply chain;
   formulating an improvement problem to reduce risk of not achieving said regulatory compliance, the improvement problem comprising an objective function to be maximized, a plurality of linear constraints, starting conditions, decision variables, and balance constraints;
   using processor circuitry, carrying, out the following steps for solving the improvement problem to reduce risk of not achieving said regulatory compliance, the improvement problem being a mixed integer problem configured for minimizing calculating power and processor resources required for solving of the improvement problem by reducing a complexity of the improvement problem by allocating each of a plurality of products to only one respective technology type:
      identifying sources of risk stemming from the new regulations, wherein a risk represents a probability of failing an inspection due to non-compliance with the new regulations;
      quantifying the identified risks by assigning hazard indices to each risk, wherein each hazard index represents a plurality of hazard levels indicating a probability of production failure due to a failed inspection in view of the new regulations, the plurality of hazard levels including a target hazard level and one or more intermediate hazard levels;
      identifying actions required for refactoring in order to reduce an exposure to the risk, wherein the actions are associated with a given effect on the hazard indices, wherein the actions are determined under a capacity feasibility constraint related to technologies used in production by the producing entity, and wherein a constraint prevents actions resulting in a diminished hazard level from taking place during the solving to reduce complexity of the improvement problem, the capacity feasibility constraint being represented by:

$$\sum_p \alpha(p, t, s) \cdot X(p, t, s, e) \le Cap(t, s, e) \forall (t, s, e)$$

where $\alpha(p,t,s)$ represents a number of time units used by technology t on system s for the production of production p, e represents a time period, and $Cap(t,s,e)$ represents a total amount of available capacity in time units of technology t on system s in time period e, $\forall$ is a universal quantification symbol, and $X(p,t,s,e)=1$ if product p is produced by technology t on system s during the time period e;
      quantifying costs of said actions;
      determining a revenue at risk as a product of a revenue and the probability of failure representing said risks, wherein said revenue at risk represents an amount of money lost as a result of the failed inspection;
      determining a sequence of actions from the identified actions based on the revenue at risk, the quantified costs of said actions, and their effect on profits by solving the improvement problem by optimizing the objective function represented by the linear constraints, starting conditions, decision variables, balance constraints, and the capacity feasibility constraint; and
   implementing the production refactoring of the producing entity according to the determined sequence of actions based on the solving of the improvement problem, wherein the determined sequence of actions comprise at least one of automatically transferring production of a particular product from the plurality of products from one system to a different system of the producing entity, delisting the product, or closing down the system or production entity.

2. The method according to claim 1, wherein quantifying the costs of the identified actions for performing the refactoring comprises adhering to an available budget for said actions.

3. The method according to claim 1, wherein identifying the actions to take for performing the refactoring is subject to a constraint on the rate of change.

4. The method according to claim 1, wherein identifying the actions to take for performing the refactoring comprises identifying unacceptable actions.

5. The method according to claim 1, further comprising quantifying said risks and identifying said actions and said costs in view of products, technology, and systems.

6. The method according to claim 1, comprising determining said sequence of actions by solving in a computerized way said refactoring process in the form of an improvement program of a mixed integer type.

7. The method according to claim 1, comprising quantifying at least two different hazard levels.

8. The method according to claim 7, wherein quantifying the identified hazard risks is dependent on the hazard levels.

9. The method according to claim 8, comprising said refactoring being dependent on costs of operation.

10. The method according to claim 9, comprising identifying said costs of operation dependent on said respective hazard level.

11. The method according to claim 7, wherein only those actions resulting in an improved hazard level are performed.

12. The method according to claim 1, further comprising determining an effective risk dependent on a maximum of respective risks related to other products in the same system and making said refactoring dependent on said effective risks.

13. The method according to claim 1, wherein said sequence of actions comprises risk transfer.

14. The method according to claim 1, wherein the actions comprise one of:
delisting of a given product, the remediation of said given product, transferring said given product to a technology, and transferring said given product to a given system.

15. The method according to claim 1, wherein the actions comprise one of:
exiting a given technology, remediation of said given technology, transferring said given technology, and introducing said given technology as new technology.

16. The method according to claim 1, wherein the actions comprise one of:
closing down a system, the remediation of a system, and introducing a new system.

17. The method according to claim 1, comprising quantifying dependent risks being interrelated between two of products, technology, and systems.

18. The method according to claim 1, comprising preventing the actions comprising relisting after delisting.

19. The method according to claim 1, comprising producing each one product in each one system only.

20. The method according to claim 1, comprising allocating only each one product to each one technology.

21. The method according to claim 1, comprising restricting a change in a hazard level related to a specific technology only in conjunction with all products using said specific technology in one of one specific system and all specific systems.

22. The method according to claim 1 being applied for refactoring a pharmaceutical company.

23. A computer-based system for production refactoring of a company comprising:
a communications interface receiving new regulations for which regulatory compliance is required, wherein refactoring is required in order to achieve said regulatory compliance with said new regulations, wherein refactoring comprises restructuring of the producing entity's supply, chain; and
processor circuitry configured for:
formulating an improvement problem to reduce risk of not achieving said regulatory compliance, the improvement problem comprising an objective function to be maximized, a plurality of linear constraints, starting conditions, decision variables, and balance constraints; and
solving an improvement problem to reduce risk of not achieving said regulatory compliance, the improvement problem being a mixed integer problem configured for minimizing calculating power and processor resources required for solving of the improvement problem by reducing a complexity of the improvement problem by allocating each of a plurality of products to only one respective technology type by:
identifying sources of risk stemming from the new regulations, wherein a risk
representing a probability of failing an inspection due to non-compliance with the new regulations;
quantifying the identified risks associated with the new regulations by assigning hazard indices to each risk, wherein each hazard index represents a plurality of hazard levels indicating a probability of production failure due to a failed inspection in view of the new regulations, the plurality of hazard levels including a target hazard level and one or more intermediate hazard levels;
identifying actions required for performing the refactoring for reducing an exposure to the risk, wherein the actions are associated with a given effect on the probability of production failure, wherein the actions are determined under a capacity feasibility constraint related to technologies used in production by the producing entity, and wherein a constraint prevents actions resulting in a diminished hazard level from taking place during the solving to reduce complexity of the improvement problem, the capacity feasibility constraint being represented by:

$$\sum_p \alpha(p,t,s) \cdot X(p,t,s,e) \le Cap(t,s,e) \forall (t,s,e)$$

where $\alpha(p,t,s)$ represents a number of time units used by technology t on system s for the production of product p, e represents a time period, and $Cap(t,s,e)$ represents a total amount of available capacity in time units of technology t on system s in time period e, $\forall$ is a universal quantification symbol, and $X(p,t,s,e)=1$ if product p is produced by technology t on system s during the time period e;
quantifying costs of said actions,
determining a revenue a risk as a product of a revenue and the probability of failure representing said risks, wherein said revenue at risk represents an amount of money lost as a result of the failed inspection;
determining a sequence of actions from the identified actions, based on the revenue at risk, the quantified costs of said actions, and their effect on profits by solving the improvement problem by optimizing the objective function represented by the linear constraints, starting conditions, decision variables, balance constraints, and the capacity feasibility constraint; and
implementing the production refactoring of the producing entity according to the determined sequence of actions based on the solving of the improvement problem, wherein the determined sequence of actions comprise at least one of automatically transferring production of a particular product from the plurality of products from one system to a different system of the producing entity, delisting the product, or closing down the system or production entity.

24. A non-transitory computer-readable storage medium having stored thereon a computer program for production refactoring of a producing entity, the computer program comprising a routine set of instructions which, when executed by a computer machine, cause the computer machine to solve an improvement problem to reduce risk of not achieving said regulatory compliance, the improvement problem being a mixed integer problem configured for minimizing calculating power and processor resources required for determining a solution of the improvement problem by reducing a complexity of the improvement problem by allocating each of a plurality of products to only one respective technology type by:

receiving new regulations for which regulatory compliance is required, wherein refactoring of the producing entity is required in order to achieve the regulatory compliance with said new regulations, wherein refactoring comprises restructuring of the producing entity's supply chain;

formulating the improvement problem to reduce risk of not achieving said regulatory, compliance, the improvement problem comprising an objective function to be maximized; a plurality of linear constraints, starting conditions, decision variables, and balance constraints;

solving the improvement problem by:
identifying sources of risk stemming from the new regulations, wherein a risk represents a probability of failing an inspection due to non-compliance with the new regulations;

quantifying the identified risks associated with the new regulations by assigning hazard indices to each risk, wherein each hazard index represents a plurality of hazard levels indicating a probability of production failure due to a failed inspection in view of the new regulations, the plurality of hazard levels including a target hazard level and one or more intermediate hazard levels;

identifying actions required for performing the refactoring for reducing an exposure to the risk, wherein the actions are associated with a given effect on the probability of production failure, wherein the actions are determined under a capacity feasibility constraint related to technologies used in production by the producing entity, and wherein a constraint prevents actions resulting in a diminished hazard level from taking place during the solving to reduce complexity of the improvement problem, the capacity feasibility constraint being represented by:

$$\sum_p \alpha(p, t, s) \cdot X(p, t, s, e) \leq Cap(t, s, e) \forall (t, s, e)$$

where $\alpha(p,t,s)$ represents a number of time units used by technology t on system s for the production of product p, e represents a time period, and $Cap(t,s,e)$ represents a total amount of available capacity in time units of technology t on system s in time period e, $\forall$ is a universal quantification symbol, and $X(p,t,s,e)=1$ if product p is produced by technology t on system s during the time period e;

quantifying costs of said actions;

determining a revenue at risk as a product of a revenue and the probability of failure representing said risks, wherein said revenue at risk represents an amount of money lost as a result of the failed inspection;

determining a sequence of actions from the identified actions, based on the revenue at risk, the quantified costs of said actions, and their effect on profits by the solving the improvement problem by optimizing the objective function represented by the linear constraints, starting conditions, decision variables, balance constraints, and the capacity feasibility constraint; and implementing the production refactoring of the producing entity according to the determined sequence of actions based on the solving of the improvement problem, wherein the determined sequence of actions comprise at least one of automatically transferring production of a particular product from the plurality of products from one system to a different system of the producing entity, delisting the product, or closing down the system or production entity.

* * * * *